United States Patent
Messmer

(10) Patent No.: US 9,283,646 B2
(45) Date of Patent: Mar. 15, 2016

(54) MOUNTING UNIT FOR A TOOL DEPOSITING DEVICE

(75) Inventor: Helmut Messmer, Emtmannsberg (DE)

(73) Assignee: Stäubil Tec-Systems GmbH, Bayreuth (DE)

(*) Notice: Subject to any disclaimer, the term of this patent is extended or adjusted under 35 U.S.C. 154(b) by 225 days.

(21) Appl. No.: 13/817,682

(22) PCT Filed: Aug. 19, 2011

(86) PCT No.: PCT/EP2011/004235
§ 371 (c)(1),
(2), (4) Date: Apr. 5, 2013

(87) PCT Pub. No.: WO2012/022497
PCT Pub. Date: Feb. 23, 2012

(65) Prior Publication Data
US 2013/0184132 A1     Jul. 18, 2013

(30) Foreign Application Priority Data
Aug. 19, 2010 (DE) .................. 20 2010 011 582 U

(51) Int. Cl.
*B23Q 3/155* (2006.01)
*B25J 15/04* (2006.01)

(52) U.S. Cl.
CPC ......... *B23Q 3/15526* (2013.01); *B25J 15/0491* (2013.01); *Y10S 483/901* (2013.01);
(Continued)

(58) Field of Classification Search
CPC ............. B25J 15/0491; B23Q 3/15526; Y10T 483/1767; Y10T 483/1779; Y10T 483/1783; Y10T 483/179; Y10T 483/1798; Y10T 483/1818; Y10T 483/1827; Y10T 483/1873; Y10S 483/901; Y10S 483/902
USPC ......... 483/44, 49, 51, 54, 57, 60, 61, 66, 901, 483/902
See application file for complete search history.

(56) References Cited

U.S. PATENT DOCUMENTS

| 3,691,626 A | * | 9/1972 | Mousseau et al. | ............... 483/44 |
| 4,558,506 A | * | 12/1985 | Kielma | ........................... 483/43 |
| 5,846,172 A | * | 12/1998 | Ira | ................................... 483/31 |

(Continued)

FOREIGN PATENT DOCUMENTS

| DE | 3710297 A1 | 10/1988 |
| DE | 3823668 A1 | 1/1990 |

(Continued)

OTHER PUBLICATIONS

International Search Report issued in PCT/EP2011/004235, mailed Nov. 3, 2011 (with English translation), 7 pages.

(Continued)

*Primary Examiner* — Sunil K Singh
*Assistant Examiner* — Michael Vitale
(74) *Attorney, Agent, or Firm* — Faegre Baker Daniels LLP

(57) ABSTRACT

A mounting unit for a tool depositing device includes a coupling carrier having a tool-side coupling element, in particular for a coupling device for a tool of a robot, and a holding device that can be connected to a mounting plate of the tool depositing device. An intermediate space is provided between the holding device and the coupling carrier to allow compensating movements between the coupling carrier and the holding device. The holding device includes two guide rails, between which the coupling carrier is pushed in. An interlocking engagement between the coupling carrier and the guide rails is produced by engaging at least one protuberance in at least one recess, wherein the at least one recess and the at least one protuberance are arranged on mutually opposing sides of the coupling carrier and of the guide rails.

12 Claims, 9 Drawing Sheets

(52) U.S. Cl.
CPC ......... *Y10S483/902* (2013.01); *Y10T 483/1767* (2015.01); *Y10T 483/1779* (2015.01); *Y10T 483/1783* (2015.01); *Y10T 483/1827* (2015.01)

(56) References Cited

U.S. PATENT DOCUMENTS

| | | |
|---|---|---|
| 5,860,900 A | 1/1999 | Dunning et al. |
| 2002/0176757 A1* | 11/2002 | Saito et al. ................... 409/135 |

FOREIGN PATENT DOCUMENTS

| | | |
|---|---|---|
| DE | 202005012600 U1 | 1/2007 |
| DE | 202007016071 U1 | 11/2007 |
| DE | 202007016098 U1 | 4/2009 |
| DE | 102009042352 A1 | 4/2010 |
| EP | 0698444 A2 | 2/1996 |
| EP | 1364754 A2 | 11/2003 |
| FR | 2608487 A * | 6/1988 ............. B23Q 3/155 |

OTHER PUBLICATIONS

International Preliminary Report on Patentability, Chapter I, issued in International Application No. PCT/EP2011/004235, dated Feb. 19, 2013, 6 pages. (with English translation of Written Opinion).

* cited by examiner

MOUNTING UNIT FOR A TOOL DEPOSITING DEVICE

CROSS-REFERENCE TO RELATED APPLICATION

The present application is a national phase application of PCT application PCT/EP2011/004235, filed pursuant to 35 U.S.C. §371, which claims priority to German Application DE 20 2010 011 582.5, filed Aug. 19, 2010. Both applications are incorporated herein by reference in their entirety.

TECHNICAL FIELD

The invention relates to a storage (mounting) unit for a tool depositing device, as well as to a tool depositing device with at least one such storage unit.

BACKGROUND

Robots or manipulators are increasingly applied in industrial manufacturing and processing processes and are capable of carrying out a multitude of different tasks such as welding, soldering, bonding, riveting or the gripping and movement of manufacturing parts. For this purpose, modern industrial robots can often be equipped with different tools. These tools are usually automatically deposited and stored by the robot, in tool depositing devices (magazines) when not in use. It is likewise common for a robot to automatically take out tools from a tool depositing device when required.

With such methods however, it has been found to be difficult to store or mount the tool depositing device such that compensation movements can be carried out by the device, which permit a secure depositing of a tool in the device, even of the positioning of the tool by the robot relative to the device differs from a desired position.

A storage unit which permits such compensation movements of a tool depositing device is known from the document EP 1 364 754 A2, cf. FIG. 10. A disadvantage of the storage unit shown in EP 1 364 754 A2 is its relatively complicated and expensive construction. Moreover, maintenance work on these storage units has been found to be time-consuming and cost-intensive, in particular if roller bearing elements need to be exchanged.

A tool exchange device and a tool holding device which includes a first coupling device and a first coupling means are described in the document EP 1 364 754 A2 and well as in the document DE 20 2007 016 071 U1 respectively. These in each case include a receiver and a stick-on sleeve for applying the coupling device or the coupling means onto a coupling element designed as a receiver bolt and as a receiver pin, respectively. It is further described that the coupling device (or the coupling means) for its part includes a tool suspension or a fastening region, via which a tool can be connected to the coupling device (or to the coupling means). Thus a connection (coupling) between the tool and the tool depositing device can be created with the mentioned coupling element and the receiver or the stick-on sleeve as well as the tool suspensions or the fastening region of the coupling device and the coupling means, respectively.

SUMMARY

Embodiments of the present invention pertain to a storage unit and a tool depositing device which overcome the mentioned disadvantages of the state of the art. The storage unit according to the invention and the tool depositing device according to the invention should thus be as simple and inexpensive as possible with regard to their manufacture and moreover as inexpensive as possible with regard to maintenance. Moreover, they should permit compensation movements and be as stable and maintenance-free as possible. Wearing parts should be exchangeable as simply as possible Accordingly, a storage unit according to the invention for a tool depositing device includes a coupling carrier having a tool-side coupling element, in particular for a tool of a robot or of a manipulator and/or for a coupling device for a tool of a robot or of a manipulator, and a holding device connectable to an assembly plate of the tool depositing device. Thereby, a positive-fit engagement exists between the holding device and the coupling carrier. Moreover, an intermediate space is provided between the holding device and the coupling carrier for permitting compensation movements between the coupling carrier and the holding device.

The holding device includes two guide rails, between which the coupling carrier is inserted. The positive-fit engagement between the coupling carrier and the guide rails is created by way of the engagement of at least one protuberance into at least one recess. Thereby, the at least one recess and the at least one protuberance are arranged at oppositely lying sides of the coupling carrier and of the guide rails. The intermediate space between the holding device and the coupling carrier includes at least one gap between the at least one protuberance and the at least one recess.

In this manner, the coupling carrier is floatingly mounted by the holding device. The coupling carrier can thereby execute compensation movements in a plane defined by the guide rails, thus, in particular, in directions parallel to the guide rails and parallel to the assembly plate. The coupling carrier may also move in a direction to one of the two guide rails, on account of the intermediate space which includes at least of one of the mentioned gaps. In some embodiments, a maximum distance between the coupling carrier and the guide rails is not more than 6 mm. In some embodiments, a maximum distance between the coupling carrier and the guide rails is not more than 3 mm. In some embodiments a maximal width of the at least one gap between the recesses and protuberances is not more than 6 mm. In some embodiments the maximal width of the at least one gap is not more than 3 mm. Thereby, the limit values for the maximal distance or for the maximal width and which are mentioned here, are maintained even with maximal displacements of the coupling carrier transverse to the guide rails. Thus, in some embodiments, in a middle position of the coupling carrier between the two guide rails, the distance between the coupling carrier and the two guide rails is in each case not more than 3 mm, or not more that 1.5 mm. Accordingly, in some embodiments, the widths of the mentioned gaps in the middle position of the coupling carrier are not more than 3 mm, or not more than 1.5 mm. In this manner, compensation movements of the coupling carrier relative to the guide rails are given sufficient space, but on the other hand and despite this, an adequately stable fixation of the coupling carrier is ensured by the guide rails.

The storage unit according to the invention thus in the simplest case includes only two guide rails which for example at least in sections can be given by L-profiles or U-profiles, and a coupling carrier which at least in sections can be given by a T-profile, (thus an I-profile), a cross-like profile or by a U-profile and which includes the coupling element at a front side (face-side). Such profiles have a very simple construction and are inexpensive to manufacture. Moreover, the guide rails can includes bores and are then connectable to the assembly plate of the tool depositing device by way of screws (screwing connections) in a particularly simple manner.

For this, the coupling carrier is simply inserted into the holding device between the two guide rails. When needed, it can be just as simply removed again, in particular for maintenance purposes. Moreover, it is possible to introduce the coupling carrier from two oppositely lying sides of the holding device, between the guide rails. Thus the storage unit according to the invention is furthermore characterized by a particularly large flexibility.

The coupling carrier can be designed in a very narrow manner with an only very small maximal width due to the fact that the coupling carrier is arranged between the guide rails and is thus laterally guided by these. In this manner, one can achieve a greater free space around the coupling carrier, and this permits an increased spatial flexibility on depositing or removing a bulky tool onto and from the coupling carrier respectively. If, in contrast, receivers or reliefs for the guide rails or other guide elements were to be machined into the coupling carrier, then inherent of the design, a greater width (or height) of the coupling carrier would be necessary, by which means the spatial flexibility would be less compared to the preferred embodiment described here.

Since the storage unit according to the invention is not a roller bearing as is common with the state of the art, but a sliding bearing, moreover all roller elements such as roller balls or roller cylinders are done away with, by which means the manufacture is simplified and the material and manufacturing costs reduced. In particular, the storage unit according to the invention by way of this is simultaneously more robust and in particular is not so sensitive with regard to shock loads, since no roller elements are envisaged, which are generally sensitive with regard to impacts and tend to lose their roundness, in particular with impact loading. The storage unit according to the invention in contrast can distribute impacts on sliding surfaces and absorb them without damage in this manner.

These sliding surfaces can be arranged on upper sides and/or lower sides of the recesses and protuberances (grooves and webs). The side surfaces of a protuberance and a recess which face one another in pairs each delimit one (of possibly several) (intermediate) gaps and in this manner also the compensation movements in the plane defined by the guide rails.

In a particularly stable embodiment, one envisages the positive-fit engagement between the coupling carrier and the guide rails being created by way of the engagement of at least two protuberances into at least two recesses. Thereby, the at least two recesses and the at least two protuberances can be arranged on sides of the coupling carrier which lie opposite one another and on sides of the two guide rails which face these sides.

In this manner, the intermediate space (gap) between the coupling carrier and one of the two guide rails can be reduced and the intermediate space (gap) between the coupling carrier and the other guide rail can be increased, with a compensation movement. Thus compensation movements at least in two directions (and two dimensions) are possible.

In an embodiment which is particularly simple to manufacture, one can envisage the mentioned gaps being empty (not filled out). However, an elastically deformable material (like a polymer material such as rubber for example) can also be brought into the gaps for creating a restoring force onto the coupling carrier in the direction of a (centred) desired position between the guide rails.

Moreover, one can envisage sliding layers being provided between the at least one recess and the at least one protuberance (for example grooves and webs), for reducing friction forces between recesses and protuberances (e.g. grooves and webs). In this manner, compensation movements already with small forces can take place and a wear due to friction can moreover be minimized. In particular, metal-plastic composite materials with a PTFE-containing cover layer are considered as sliding materials for the mentioned sliding layers and these can moreover also contain metal, (in particular lead), with an intermediate layer of sintered bronze and a steel or bronze back. However, other sliding materials can also be used, such as for example materials which contain graphite, ceramic and/or plastic, such as polytetrafluorethylene.

In the case that the sliding material is elastically deformable, the coupling carrier can also (even if to a relatively limited extent) carry out compensation movements perpendicularly to the above-mentioned plane defined by the guide rails, thus away from the assembly plate or towards this.

In a further development, at least one pair of bores which are aligned to one another is provided in the guide rails, as well as at least one bore in the coupling carrier. By way of displacing the coupling carrier along the guide rails, the bore (or one of the bores) of the coupling carrier can be aligned in a flush manner to the pair of bores (or to one of these pairs of bores). The bores which are aligned in a flush manner in this way serve for receiving a securing pin which can be pushed into these bores. In this manner, the coupling carrier can be secured in the holding device. In the case that the guide rails and/or the coupling carrier includes several such bores or pairs of bores, then one can achieve an adjustability of the storage unit. Depending on the requirement, the coupling carrier can be displaced between the guide rails and subsequently secured (locked) by way of the securing pin, until a desired position of the coupling element is achieved. In this manner, the storage unit is characterized by a particularly large flexibility.

The securing pin can have a diameter which is smaller than a diameter of the bores, into which it is introduced, so that an intermediate gap exists between the securing pin and the bores. In some embodiments, the diameter of the securing pin is at least 3 mm smaller than the diameter of the bores, or at least 6 mm smaller than the diameter of the bores. In this manner, compensation movements transverse to the securing pin are made possible. One may then also envisage this intermediate gap (at least partly) being filled out with an elastically deformable filling material (for example with a polymer material), for producing a restoring force onto the coupling carrier transversely to the securing pin. This filling material can also be given by a coating of the securing pin or of the inner walls of the bore.

In a further embodiment, one envisages the coupling element being arranged on a front side of the coupling carrier which is bevelled relative to the side surfaces of the coupling carrier, into which the recesses or protuberances are machined, or relative to a longitudinal axis of the coupling carrier. In this manner, the storage unit by way of a bevelling of the front side can be flexibly adapted to the geometric demands. The flexibility of the storage unit is particularly large if the coupling carrier (at least in a section) is given by a symmetrical I-profile (H-profile). Then, it is advantageously possible to introduce the coupling carrier into the holding device in a manner rotated by 180 degrees about a longitudinal axis (running parallel to the recesses or protuberances) of the coupling carrier, so that the bevelling of the front side now runs in an opposite direction. Thus with such a coupling carrier, the coupling element can be aligned in to opposite bevellings.

In a further development, the coupling element is designed as a receiver bolt or coupling pin for applying a tool or a coupling device onto the receiver bolt or the coupling pin. Thereby, the tool or the coupling device include a receiver or stick-on sleeve, which correspond to the receiver bolt, for receiving the receiver bolt or the coupling pin. In particular, it is possible to design the receiver bolt or the coupling pin in manner described in the documents EP 1 364 754 A2 and DE 20 2007 016 071 U1, for achieving the suitability and advantages mentioned there. Likewise, the coupling device may be designed in one of the embodiments described in DE 20 2007 016 071 U1 or as a first coupling device described in EP 1 364 754 A2, for achieving the suitability and advantages described there.

The coupling carrier can include a sensor for recognising a tool connected to a coupling element. Such a sensor can in particular include a spring element such as a spiral spring or a gas spring, which is pressed together in the case of a tool being connected to the coupling element. In this case, an electrical contact can be closed by the spring element, for producing an electrical signal which can be transmitted to an evaluation unit.

The tool depositing device according to the invention includes at least one storage unit of the type suggested here. Thereby, the two guide rails of the holding device can in particular include bores and be screwed to the assembly plate by way of screw connections. One can also envisage the guide rails being connected to the assembly plate with a firm bond (such as being welded) or being given as protuberances of the assembly plate.

The advantages of the storage unit according to the invention and the respective embodiments are also adopted by the tool holder device suggested here.

Thus the tool holding device according to the invention is firstly characterized by a simple and inexpensive manufacture. Moreover, the coupling carrier is easily exchangeable and adjustable within the holding device by way of displacement along the guide rails. Finally, the tool holding device on account of the design of the storage unit as a sliding bearing is more robust than most commonly used roller bearings.

In one embodiment of the tool depositing device, an end-piece of the coupling carrier projects in a self-supporting manner beyond the assembly plate of the tool depositing device. One can moreover envisage end-pieces of the guide rails projecting in a self-supporting manner beyond the assembly plate. In this manner, a particularly large free movement play room to maneuver for the tools which are to be connected with the tool depositing device and which are often voluminous and bulky is achieved, and the danger of a collision of these tools with the assembly plate or other parts of the tool depositing device, such as a base or a supporting leg of the tool depositing device, on which the assembly plate is assembled, is reduced. For this purpose, the coupling element is preferably fastened on this end-piece of the coupling carrier, as is described by way of the subsequent embodiment examples.

BRIEF DESCRIPTION OF THE FIGURES

Special embodiments of the invention described here are explained in more detail by way of FIGS. 1 to 7. There are shown in.

DETAILED DESCRIPTION

Figure 1:
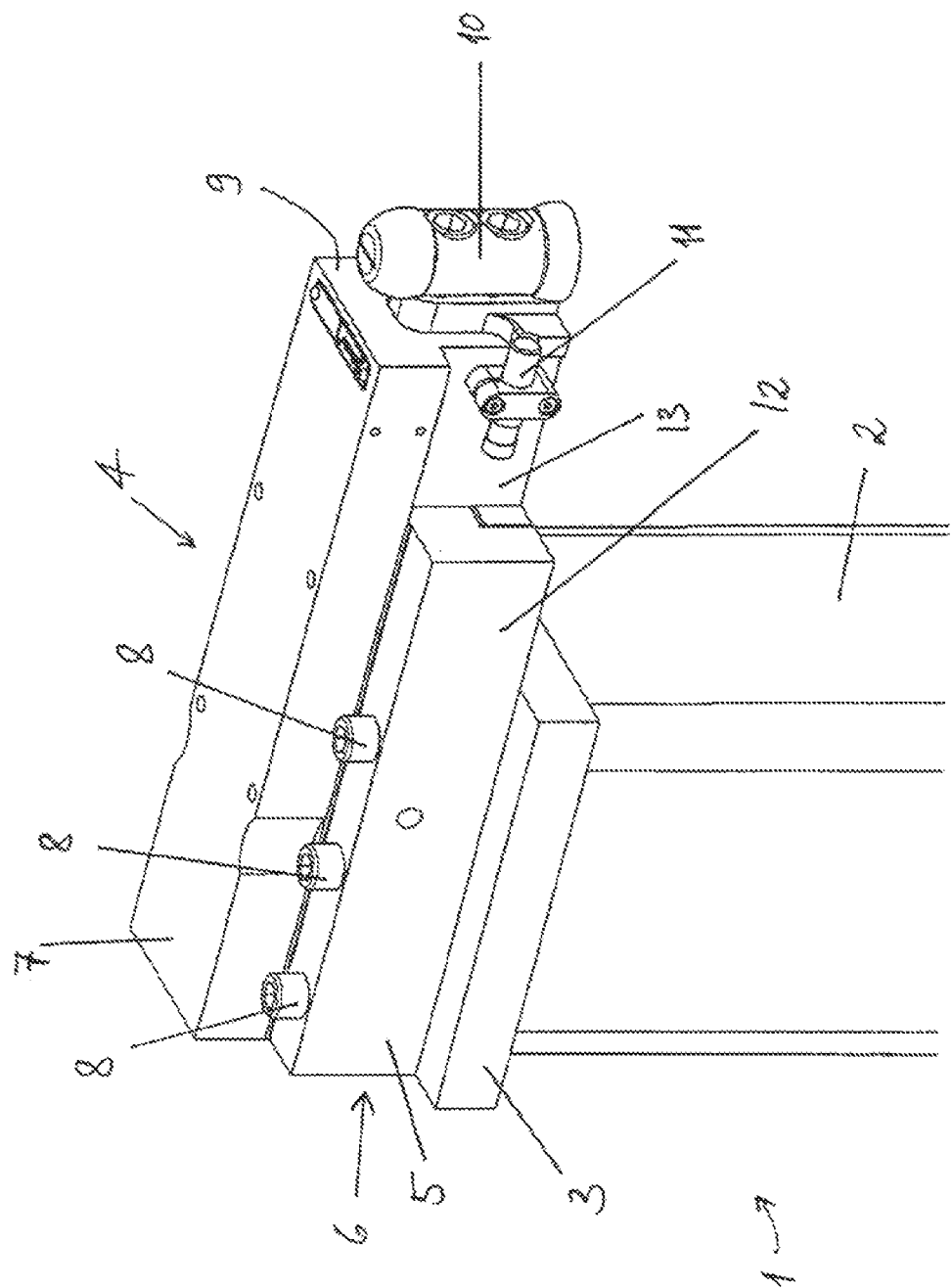
FIGS. 1 to 3 show a tool depositing device with a storage unit in a view obliquely from above.

In the figures, the recurring reference numerals indicate the same features; see the list of reference numerals below.

A tool depositing device 1 of the type suggested here is schematically illustrated in FIG. 1. The tool depositing device includes a supporting leg 2, on which a horizontally aligned assembly plate 3 is fastened. A storage unit 4 is assembled on the assembly plate 3, and has a holding device 6 for a coupling carrier 7, said holding device including two guide rails 5.

The guide rails 5 (only one is visible here) are fastened on the assembly plate 3 with screw connections 8. The coupling carrier which is introduced between the guide rails 5 into the holding device 6 is engaged with this holding device with a positive fit (cf. FIG. 4). The coupling carrier on a front side 9 includes a coupling element 10 designed as a receiver bolt, for sticking a coupling device for a tool, onto the receiver bolt (cf. FIGS. 6 and 7).

The carriage-like coupling carrier 7 apart from the coupling element 10 includes a sensor 11 which is designed as a spring element (gas spring). In the case that a coupling device with a tool is stuck onto the receiver bolt 10, the spring element of the senor 11 is pressed together, by which means an electrical contact is closed and an electric signal is produced. This is led further to an evaluation unit (not shown), by a cable.

The end-pieces 12 of the guide rails 5 project in a self-supporting manner beyond the assembly plate 3. Likewise, an end-piece 13 of the coupling carrier 7 projects beyond the assembly plate 5, and even beyond the end-pieces 12 of the guide rails 5. In this manner, movement restrictions due to the supporting leg 2 or the assembly plate 3 can be largely avoided.

Figure 2:
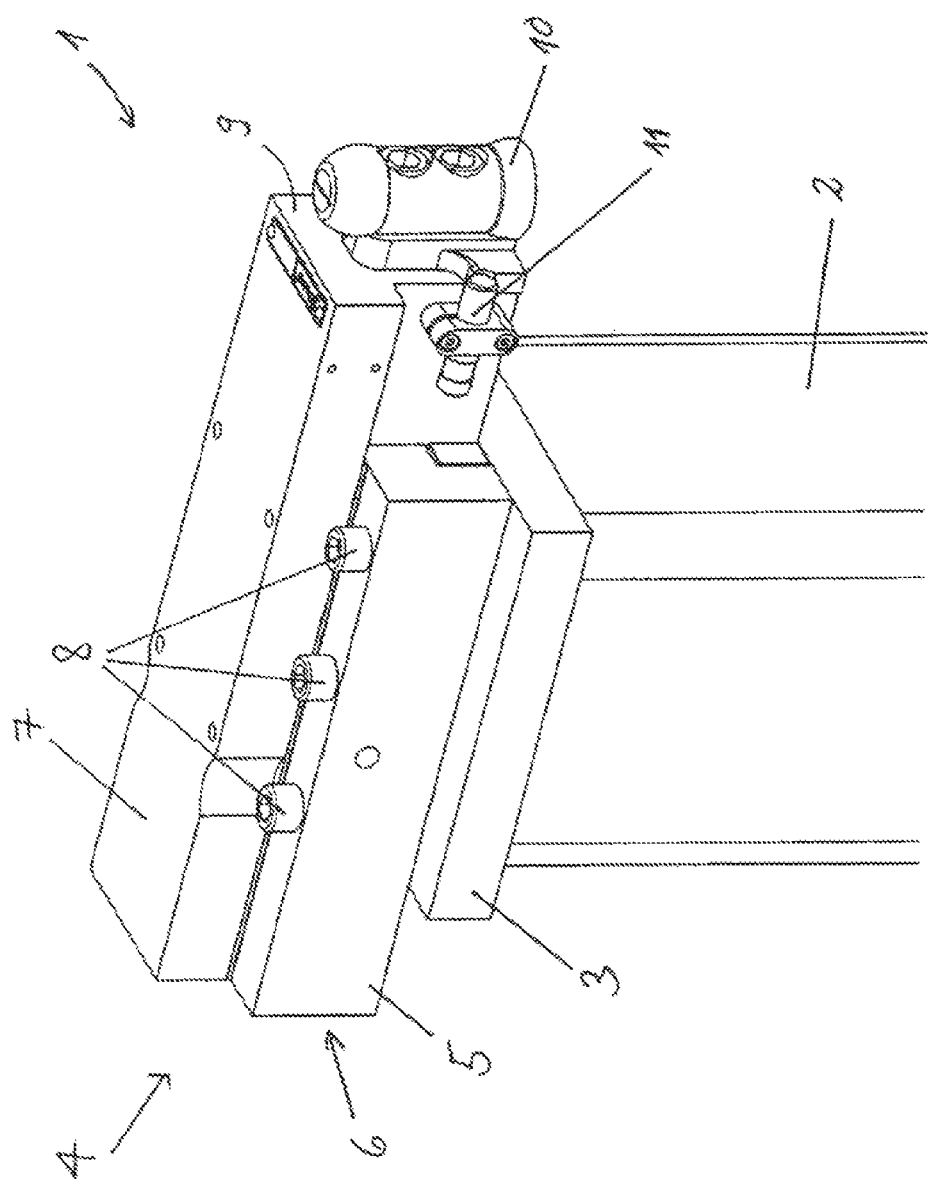

The tool depositing device shown in FIG. 1 is shown in FIG. 2, wherein the coupling element 10 of the coupling carrier 7 now (in contrast to FIG. 1) is arranged on a side which is away from the end-piece 12 of the guide rail. This arrangement is rendered possible by way of the symmetrical design of the guide rails 5 and of the coupling carrier 7, which permits an insertion of the coupling carrier 7 between the guide rails 5 from two sides.

Figure 3:
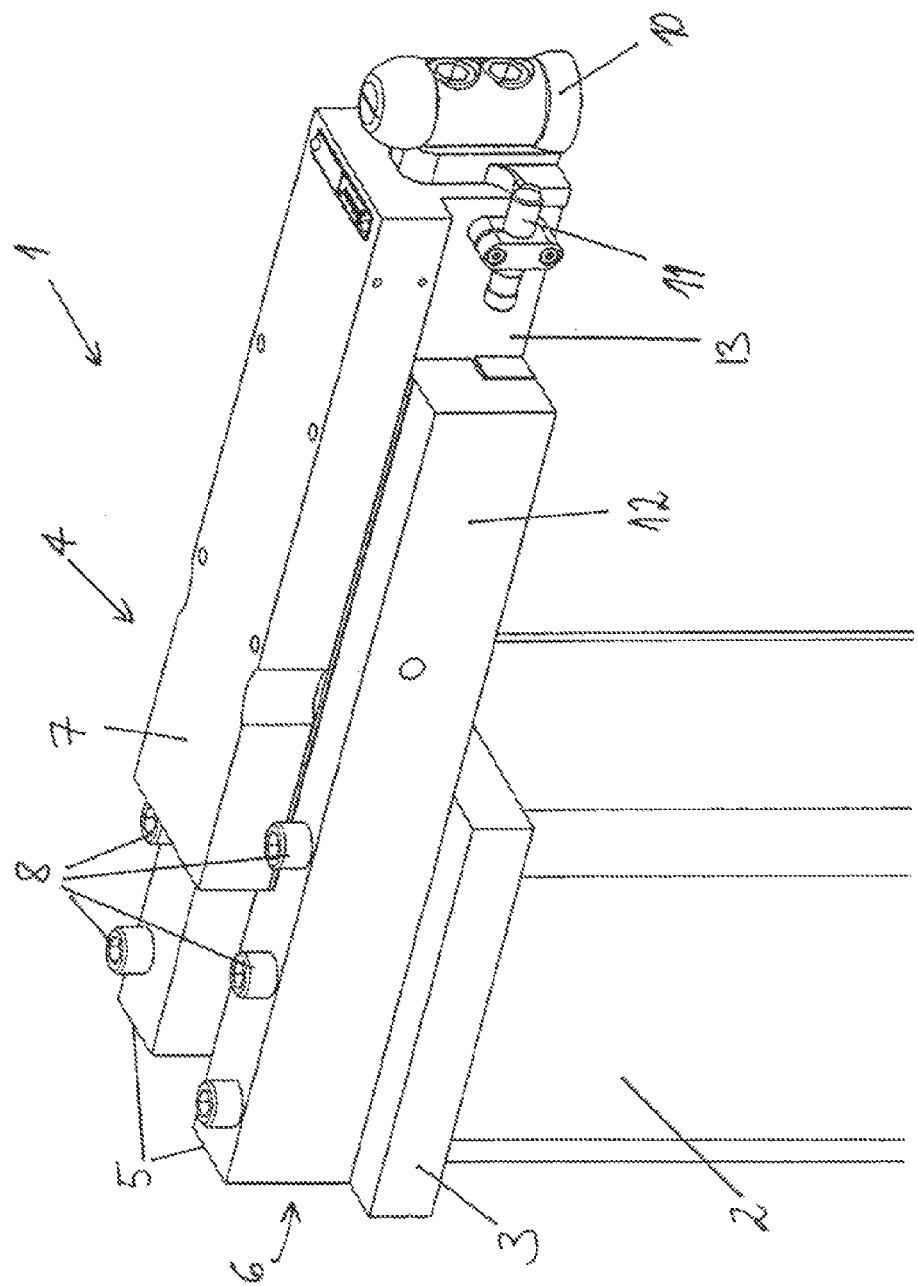

The tool depositing device 1 shown in FIG. 3 differs from the tool depositing device 1 shown in FIG. 1 merely by way of the guide rails 5 which in the embodiment shown here have a greater length. In this manner, the end-pieces 12 of the guide rails 5 project in a self-supporting manner even further beyond the assembly plate 3. Accordingly, the end-piece 13 of the coupling carrier 7 projects even further beyond the assembly plate 3 in a self-supporting manner, by which means movement restrictions due to the assembly plate 3 or the supporting leg 2 can be largely avoided.

Figure 4:
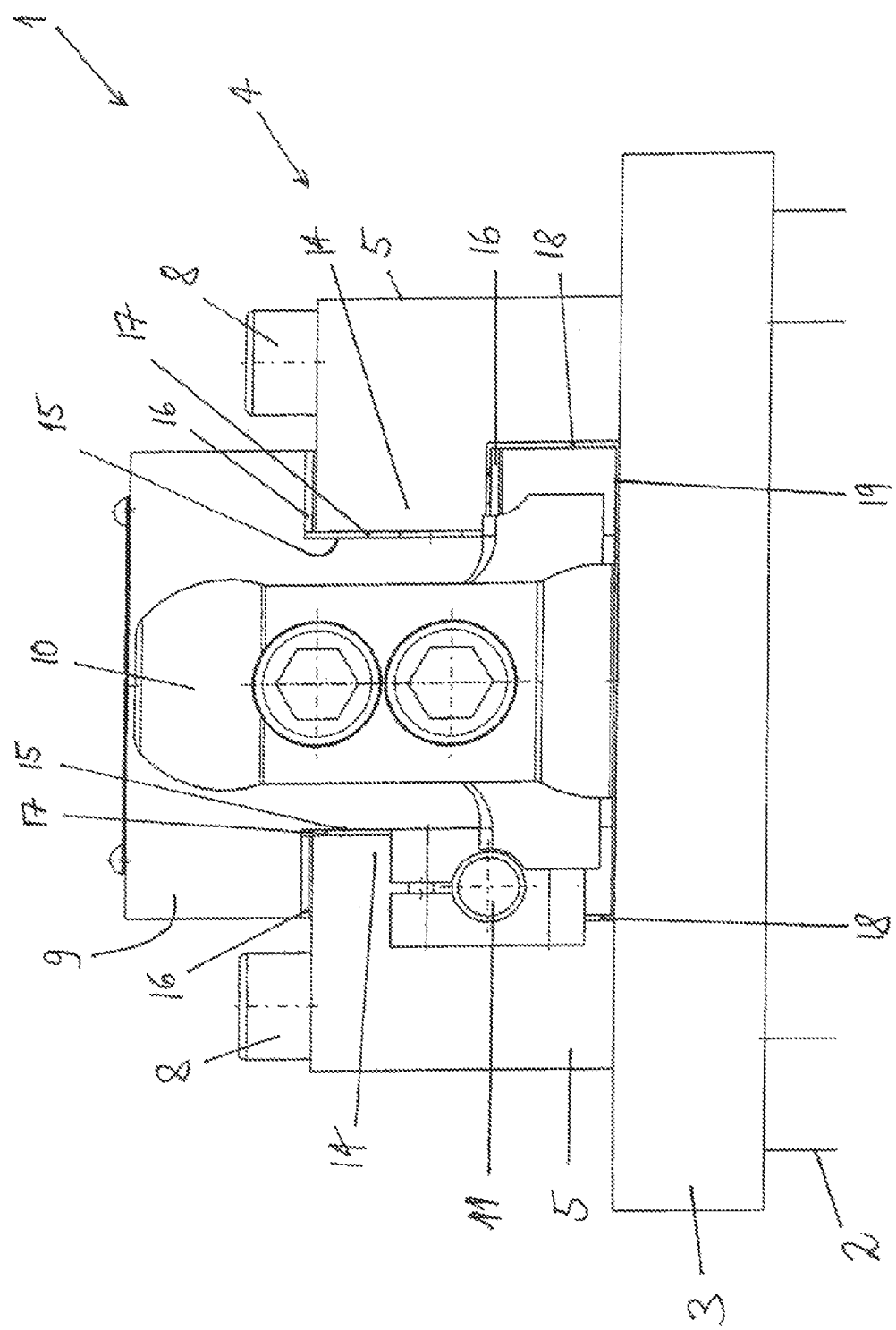
FIG. 4 shows the tool depositing device shown in FIGS. 1 to 3, in a view from the front.

The tool depositing device 1 which is shown in FIG. 1 (detail) is schematically shown in FIG. 4 in a view from the front. One can particularly recognize the two guide rails 5 of the holding device 6 which are connected to the assembly plate 3 by way of screw connections 8. The guide rails 5 are given by L-profiles and thus each have a protuberance 14 designed as a web. The webs 14 are arranged on sides of the guide rails 5 which face one another and are in a positive-fit engagement with two recesses 15 of the coupling carrier 7 introduced into the holding device 6 between the guide rails 5, said recesses being designed as grooves 15. The two grooves 15 are incorporated in two side surfaces of the coupling carrier which are away from one another.

Moreover, sliding layers 16 are given in an intermediate space between the upper sides and the lower sides of the grooves 15 and the webs 14. These sliding layers 16 consist of a metal-plastic composite material and have a cover layer containing PTFE and lead, and an intermediate layer containing sintered bronze and deposited onto a steel back (lowermost layer). The sliding layers 16 of the mentioned composite material are self-lubricating and are characterized by particularly good wear and friction properties.

The side surfaces of the webs and one of the grooves and which face one another in pairs in each case delimit one of two (intermediate) gaps 17 and in this manner also permit compensation movements in the plane defined by the guide rails.

Further intermediate gaps (intermediate spaces) moreover exist below the gaps mentioned above 17, between the guide rails 5 and the coupling carrier 7, and these intermediate gaps are indicated with the reference numeral 18, and between the assembly plate 3 and the coupling carrier 7 this intermediate gap is indicated with the reference numeral 19.

The widths of the mentioned (intermediate) gaps 17, 18 and 19 in the shown middle position of the coupling carrier 7 are each about 1 mm. In a laterally displaced position of the coupling carrier 7, the gaps 17 and 18 can be smaller or have a maximal width of up to 2 mm. Thus a maximal distance between the coupling carrier 7 and the guide rails 5 in this embodiment example is 2 mm.

Figure 5:
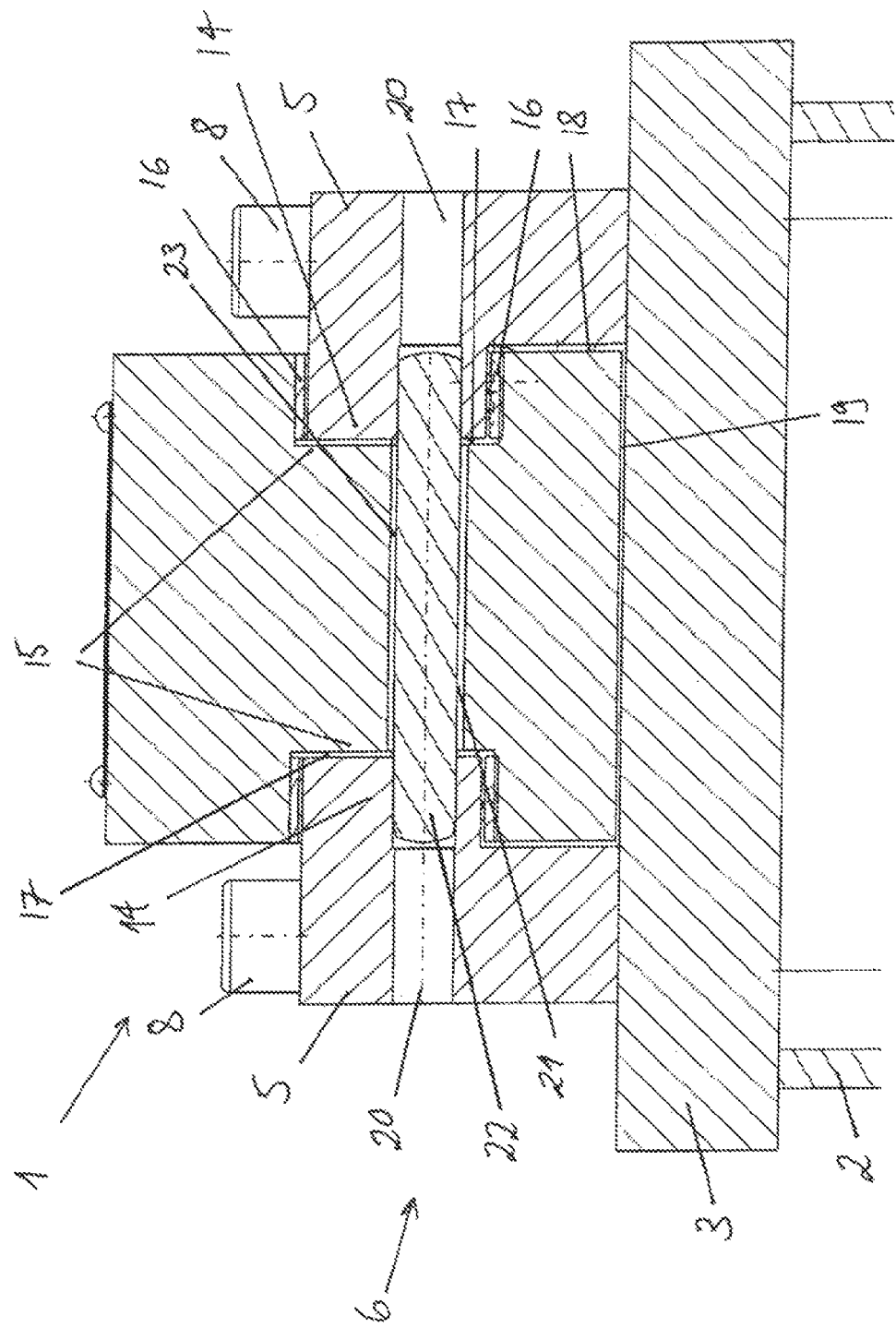
FIG. 5 shows a cross section through the tool depositing device which is shown in FIGS. 1 to 4.

A cross section through the embodiment example 1 shown in FIG. 1 is represented schematically in FIG. 5. Thereby, the section plane runs perpendicularly to the assembly plate 3 as well as perpendicularly to the course of the guide rails 5. Moreover, the section plane runs through a pair of bores 20 which are aligned to one another, in the two guide rails 5, as well as through a bore 21 in the coupling carrier 5, wherein this bore is aligned with the latter mentioned bores 20. A securing pin 22 is pushed through these three bores and the diameter of this pin is slightly smaller, in this example smaller by about 3 mm, than the diameter of the bore 22 through the coupling carrier. In this manner, an (annular) gap 23 between the securing pin 22 and the bore 21 through the coupling carrier and having a width of about 1.5 mm arises, by which means compensation movements transverse to the securing pin 22 are also possible additionally to the compensation movements of the coupling carrier 5 along the securing pin 22.

A tool depositing device of the type suggested here and which differs from the tool depositing device shown in FIG. 1 only by way of the end-piece 13 of the coupling carrier 5, is represented in FIGS. 6, 6a, 7 and 7a. This end-piece 13 in the example represented schematically in FIGS. 6, 6a, 7 and 7a is bevelled by an angle of 45° with respect to a longitudinal axis of the storage unit (drawn dashed in FIG. 6). Of course, it would also be possible to bevel the end-piece by any other angle, in order to achieve another alignment of the front side 9 of the coupling carrier and thus of the coupling element (not shown here) arranged on the front side 9.

Figure 6:
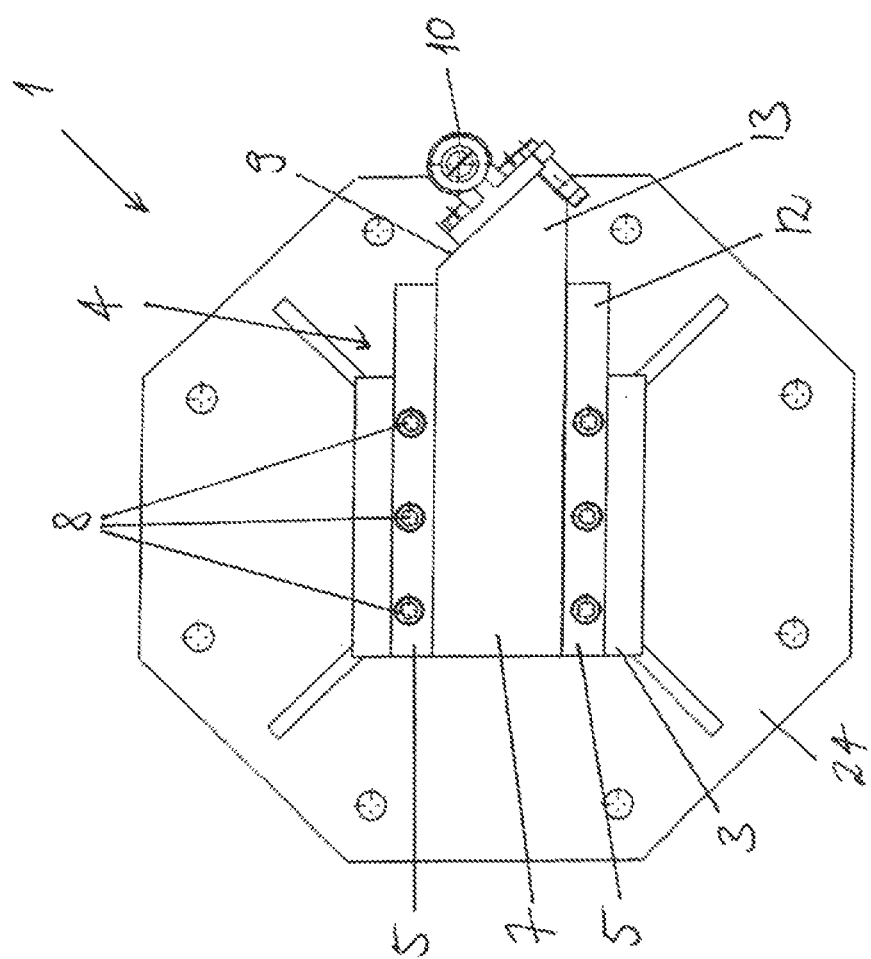
FIGS. 6, 6a, 7 show a tool depositing device with a bevelled storage unit, in a view from above and obliquely from above.
Figure 6A:
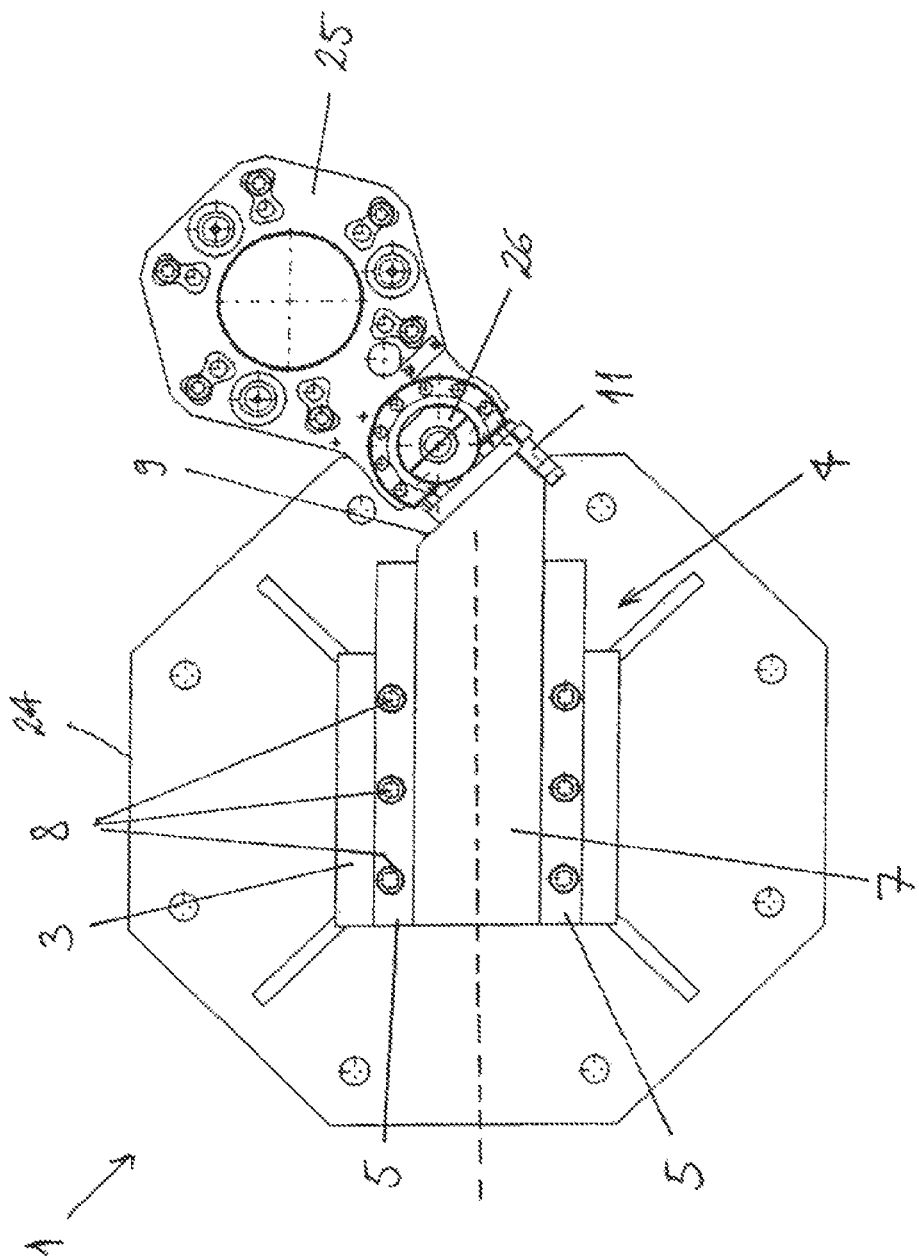

Moreover, a base plate 24 which carries the supporting leg 2 of the tool depositing device is shown in FIGS. 6 and 6a.

The coupling carrier 7 up to the end-piece 13 has a symmetrical I-shape profile. By way of this symmetrical design of the cross section of the coupling carrier 7, it is also possible to push the coupling carrier between the guide rails 5, also after a rotation by 180° about its longitudinal axis (drawn dashed) and to fasten it. Thus two oblique alignments of the coupling element 10 relative to the longitudinal axis of the storage unit 4 can be achieved with a bevelled coupling carrier.

Figure 7:
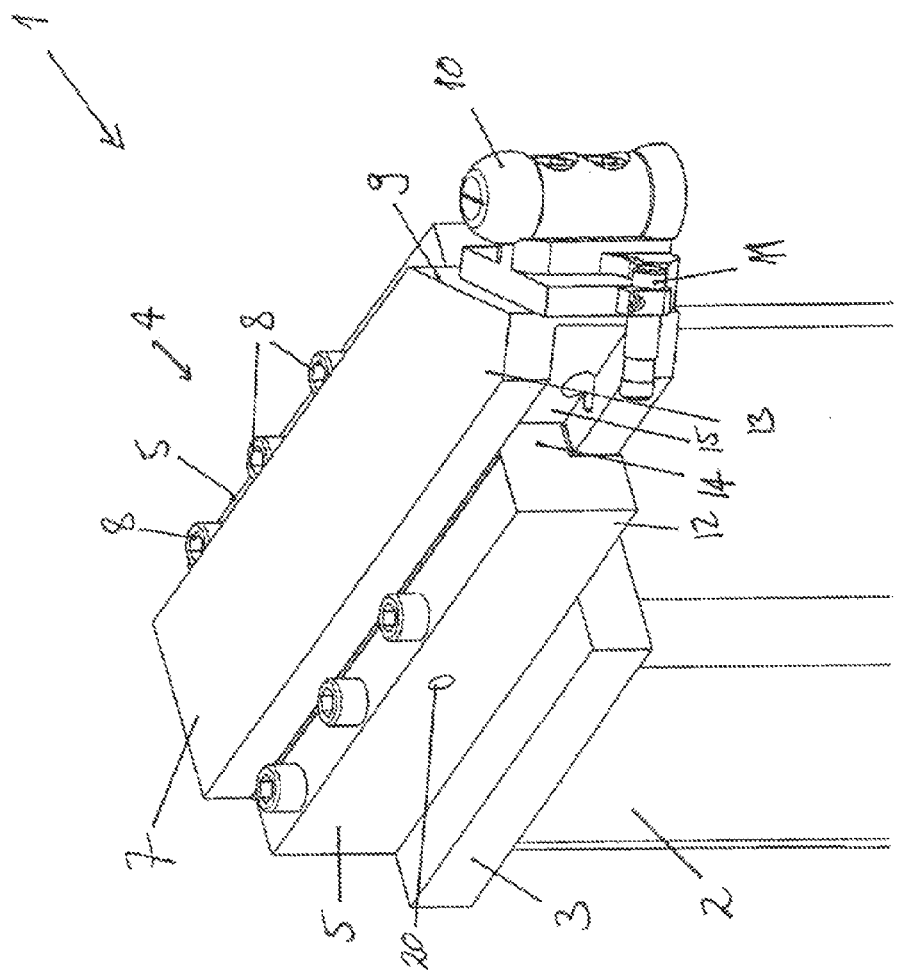
Figure 7A:
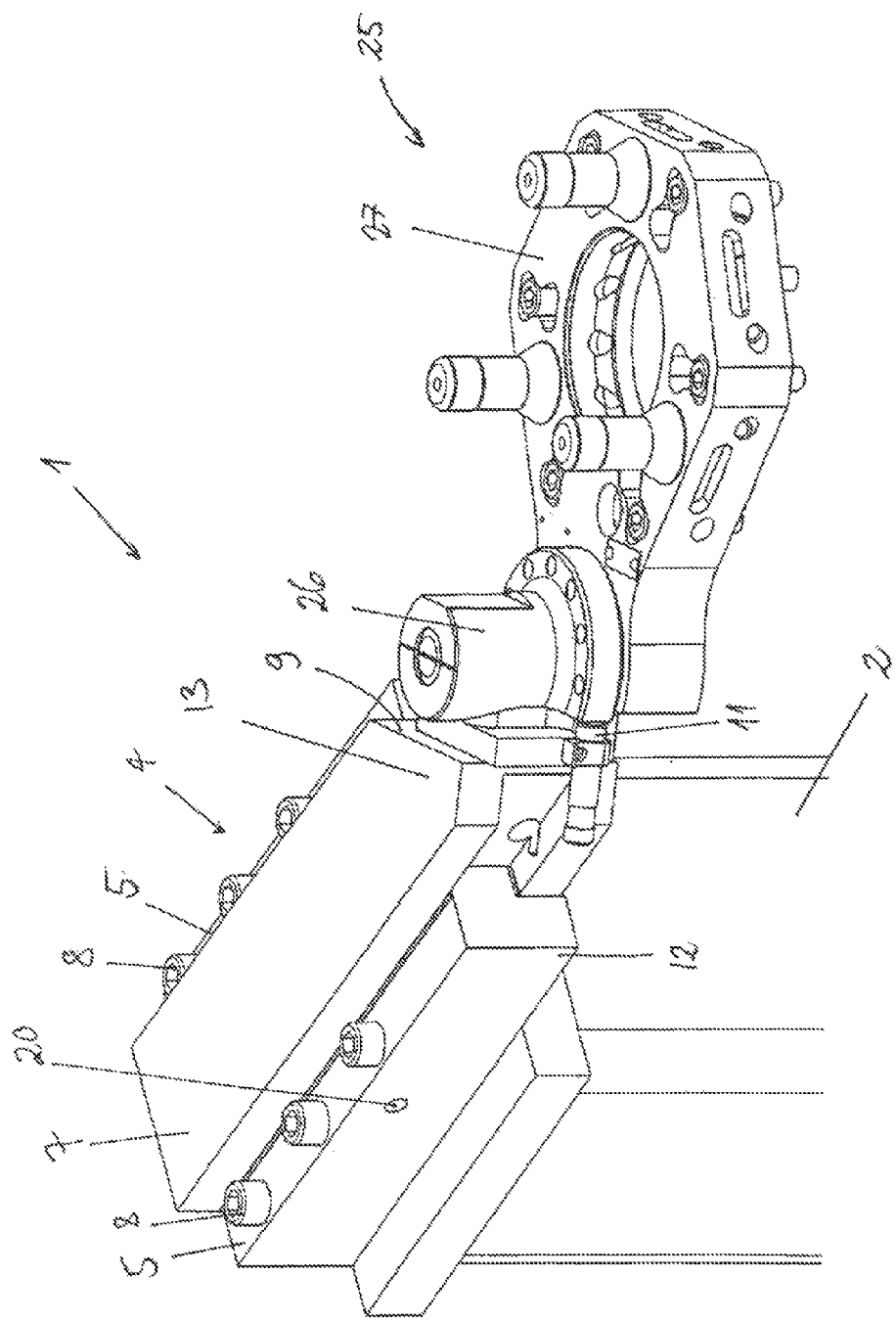

In the representations shown by way of FIGS. 6a and 7a, a coupling device 25 with a receiver 26 is put onto the coupling element 10, cf. FIGS. 6 and 7, which in this example is designed as a receiver bolt, so that the receiver bolt 10 is introduced into the receiver 26 from below. The coupling device 25 includes a tool suspension 27 for connecting a tool (not shown here) to the coupling device 25. The shown coupling device 25 is described in the document DE 202007 016 071 U1.

On putting the receiver 26 onto the receiver bolt 10, the coupling carrier 7 on account of its floating mounting in the guide rails 5 can carry out compensation movements along the guide rails 5 and transversely to the guide rails 5 in a plane defined by the guide rails. Thereby, these compensation movements are limited by the gaps and intermediate spaces 17, 18, 19 between the coupling carrier 7, the guide rails 5 and the assembly plate 3 as well as by the annular gap 23 shown in FIG. 5, said gaps and intermediate spaced having been described with regard to FIG. 4.

LIST OF REFERENCE NUMERALS

1 tool depositing device
2 supporting leg
3 assembly plate
4 storage unit
5 guide rail
6 holding device
7 coupling carrier
8 screw connection
9 front side of the coupling carrier
10 coupling element
11 sensor
12 end-piece of the guide rail
13 end-piece of the coupling carrier
14 protuberance
15 recess
16 sliding layer
17 gap between the groove and web
18 gap below the groove and web
19 gap between assembly plate and coupling carrier
20 bore through guide rail
21 bore through coupling carrier
22 securing pin
23 annular gap
24 base plate
25 coupling device or tool
26 receiver
27 tool suspension

The invention claimed is:

1. A storage unit for a tool depositing device having an assembly plate, the storage unit comprising:
   a coupling carrier including a coupling element, wherein the coupling carrier comprises at least one recess;
   a holding device connectable to the assembly plate of the tool depositing device, the holding device comprising:
      two guide rails, between which the coupling carrier is inserted, wherein each of the guide rails includes at least one protuberance;
      wherein the at least one protuberance of the guide rails is engaged in the at least one recess of the coupling carrier, respectively, to form a positive-fit engagement between the holding device and the coupling carrier; and
      an intermediate space provided between the holding device and the coupling carrier to permit compensation movements between the coupling carrier and the holding device, the intermediate space including at least one gap between non-bearing surfaces of the at least one protuberance and the at least one recess;
wherein the at least one recess and the at least one protuberance are arranged on engaging sides of the coupling carrier and the guide rails;
bores provided in the guide rails and in the coupling carrier, the bores configured to be aligned to one another in a flush manner such that they have a common center axis perpendicular to the course of the guiderails by displacing the coupling carrier along the two guide rails; and
a securing pin pushed into the bores that are aligned in a flush manner in order to secure the coupling carrier in the holding device.

2. The storage unit of claim 1, wherein at least one of the at least one protuberance is designed as a flange on one of the two guide rails.

3. The storage unit of claim 1, wherein at least one of the at least one recess is designed as a groove on the coupling carrier.

4. The storage unit of claim 1, further comprising a sliding layer for reducing friction forces, the sliding layer provided between at least one of the at least one protuberance and at least one of the at least one recess.

5. The storage unit of claim 1, wherein the positive-fit engagement between the coupling carrier and the guide rails is created by engagement of at least two protuberances in at least two recesses, wherein the at least two recesses and the at least two protuberances are arranged on sides of the coupling carrier which lie opposite one another and on sides of the two guide rails which face these sides of the coupling carrier.

6. The storage unit of claim 1, wherein at least one of the two guide rails has an L-shaped sectional profile.

7. The storage unit of claim 1, wherein the coupling carrier has an I-shaped sectional profile.

8. The storage unit of claim 1, wherein a side of the coupling carrier where the coupling element is arranged is bevelled relative to a longitudinal axis of the coupling carrier, a bevel angle extending in a plane parallel to the longitudinal axis and a surface of the assembly plate.

9. The storage unit of claim 1, wherein the coupling element is designed as a receiver for receiving a tool or a coupling device for a tool.

10. The storage unit of claim 1, wherein the coupling carrier further comprises a sensor for recognizing a coupling device connected to the coupling element, or a tool connected to the coupling element.

11. A tool depositing device comprising the storage unit of claim 1.

12. The tool depositing device of claim 11, wherein an end-piece of the coupling carrier projects in a self-supporting manner beyond the assembly plate of the tool depositing device.

* * * * *